United States Patent Office 3,689,294
Patented Sept. 5, 1972

3,689,294
PORTLAND CEMENT COMPOSITIONS
AND METHOD
Stephen Braunauer, 39 Chestnut St.,
Potsdam, N.Y. 13676
No Drawing. Continuation-in-part of application Ser. No.
811,239, Mar. 27, 1969. This application June 14, 1971,
Ser. No. 153,107
Int. Cl. C04b 7/13, 13/28
U.S. Cl. 106—90                              7 Claims

ABSTRACT OF THE DISCLOSURE

A free-flowing expanding cement paste is made by mixing finely ground cement with at least 0.0025 part of alkali or alkaline earth lignosulfonate and with about 0.20–0.28 part of water containing at least 0.0025 part of alkali carbonate. Mixtures of aggregate with such low-porosity pastes yield, on curing, mortars and concretes of improved strength and dimensional stability.

---

This application is a continuation-in-part of my co-pending application Ser. No. 811,239, filed Mar. 27, 1969, now abandoned.

This invention relates to a method for making cement paste and the paste composition thereby produced, and to mortar and concrete containing such cement paste.

Conventional portland cement is made by burning a ground mixture of limestone and clay or shale to produce clinkers composed primarily of mixed calcium silicates, calcium aluminates, and calcium aluminoferrites. The clinkers together with a few percent of gypsum are ground to a fine powder, which forms a paste when mixed with water.

Properly made cement pastes set within a few hours and then harden slowly. When sand or sand, crushed rock and/or gravel are incorporated in cement paste, mortar and concrete are obtained. The paste acts as the cementing material and its composition has a decisive effect on the engineering properties of the resultant concrete, i.e., strength and dimensional stability. During the early stages of hardening while in contact with water or air saturated with water, concrete expands slightly. Subsequently, when the concrete is exposed to lower ambient humidities, it shrinks. The extent of shrinkage is greater than the amount of initial expansion, and the resultant overall shrinkage may produce stress-induced cracking and other undesirable effects within the concrete.

It is known that mixing more water with a given quantity of cement powder increases shrinkage and results in a weaker, more porous concrete. Conversely, the lowest possible initial water-to-cement powder ratio would yield a superior concrete from the point of view of minimizing shrinkage and increasing ultimate concrete strength.

The weight ratio of water to cement powder in conventional concreting practice is between 0.4 and 0.6; lower ratios give rise to stiff, unworkable concrete. However, using the method of the present invention, a free-flowing cement paste can now be prepared with a water-to-cement ratio of only 0.2, and well workable mortar and concrete with water-to-cement ratios of only about 0.25 and 0.22–0.28, respectively.

It is, therefore, a principal object of the present invention to provide a free-flowing cement paste composition, and thereby an excellently workable concrete, with a lower water-to-cement ratio than conventionally utilized.

It is a further object of the invention to provide a cement paste which produces a superior concrete having smaller shrinkage and higher strength than conventional concretes.

These and other objects and advantages of the invention will become apparent on consideration of the description and discussion which follow:

In its method aspect, the present invention is a method for making a free-flowing expanding portland cement paste which comprises grinding portland cement clinker to a specific surface area between 6000–9000 cm.$^2$/g., mixing the ground cement with at least 0.0025 and preferably 0.005–0.010 part by weight of alkali or alkaline earth lignosulfonate, and then with about 0.20–0.28 part by weight of water containing at least 0.0025 and preferably .005–0.015 part by weight of alkali carbonate, all per part of ground cement. At least 0.0005 and preferably 0.002–0.005 part by weight of a grinding aid is added to the clinker to assist in grinding. When alkaline earth lignosulfonate is used, it must be ground or mixed together with the dry cement powder. However, alkali lignosulfonate or other water-soluble sulfonated lignins can be added in the mix water together with the alkali carbonate.

In its composition aspect, the present invention is a free-flowing cement paste consisting essentially of finely ground portland cement, about 0.20–0.28 part by weight of water, at least 0.0005 and preferably 0.002–0.005 part by weight of a grinding aid, at least 0.0025 and preferably 0.005–0.010 part by weight of alkali or alkaline earth lignosulfonate and at least 0.0025 and preferably 0.005–0.015 part by weight of alkali carbonate, all per part of cement. The present invention also contemplates mortar and concrete made from such cement pastes. The cement paste can be prepared first and then mixed with aggregate; or the dry materials can be mixed first with water containing alkali carbonate. The order of mixing of the constituents makes no essential difference.

As contrasted to the approximately 4000 cm.$^2$/g. specific surfaces of conventional portland cement powder (determined by the method of Blaine ASTM Designation C204), the ground clinker used in practicing the present invention has a specific surface in the range 6000–9000 cm.$^2$/g. Clinker ground to such high fineness, particularly when ground without gypsum, would be expected to rapidly hydrate and flash set on mixing with water. An alkali or alkaline earth metal lignosulfonate, such as the sodium, potassium, ammonium, calcium or magnesium lignosulfonate, or other sulfonated lignin, is added to retard hydration and at the same time maintain the paste workable in spite of its low water content. The water added contains an alkali metal carbonate such as sodium, potassium or ammonium carbonate (as used herein, the term "alkali metal" is inclusive of ammonium). This combination of additives obviates the need to add gypsum to the cement powder utilized in practicing the present invention. The additives work together to obtain the desired result, as will be discussed later.

As noted above, a grinding aid is added to the cement clinker in order to achieve the high degree of powder fineness required. The grinding aid also participates in maintaining the cement free-flowing and affects the workability and setting properties of the cement paste and the ultimate strength properties of the concrete.

Generally speaking, the most satisfactory grinding aids for use in practicing the present invention are surfactants containing both polar and non-polar groups. The polar groups of the surfactant are attracted to the ions of the

TABLE I

| Grinding aid | Surface, cm.²/g. | Percent ligno-sulfonate | Percent $K_2CO_3$ | Consistency | Compressive strength, p.s.i., after— | | | | |
|---|---|---|---|---|---|---|---|---|---|
| | | | | | 1 day | 7 days | 28 days | 90 days | 180 days |
| A | 7,780 | 1.5 | 3.0 | 3-4 | 8,400 | 10,900 | 11,200 | | |
| A | 7,780 | 1.0 | 1.5 | 3-4 | 4,200 | 18,900 | 19,100 | | |
| A | 7,780 | 1.0 | 0.5 | 3-4 | 13,100 | 15,000 | 21,400 | | |
| B | 6,800 | 1.0 | 0.5 | 5 | 500 | 11,000 | 26,600 | | |
| C | 7,800 | 1.0 | 0.5 | 5 | 11,600 | 18,400 | 22,500 | | |
| D | 8,400 | 1.0 | 0.5 | 5 | 14,000 | 15,300 | 22,300 | | |
| D | 7,030 | 1.0 | 0.5 | 5 | | | 22,400 | 33,500 | 34,800 |
| E | 8,650 | 1.0 | 0.5 | 4 | 3,700 | 18,600 | 29,700 | | |
| E | 8,150 | 1.0 | 0.5 | | 2,000 | 20,500 | 24,100 | 34,600 | 36,400 |
| F | 8,450 | 1.0 | 0.5 | 5 | 700 | 15,900 | 26,600 | | |
| F | 8,170 | 1.0 | 0.5 | 5 | 600 | 12,500 | 20,000 | 30,000 | 33,800 |
| G | 7,420 | 1.0 | 0.5 | 5 | 450 | 11,500 | 22,300 | | |
| H | 8,200 | 1.0 | 0.5 | 4 | 300 | 16,400 | 26,000 | | |
| I | 8,400 | 1.0 | 0.5 | 3-4 | 450 | 12,000 | 20,500 | | |
| J | 8,400 | 1.0 | 0.5 | 1 | 400 | 11,500 | 20,000 | | |
| K | 8,740 | 1.0 | 0.5 | 3-4 | 550 | 18,100 | 22,600 | | |
| L | 8,130 | 1.0 | 0.5 | 4-5 | 400 | 16,700 | 21,200 | | |
| L | 8,130 | 0.75 | 0.35 | 1 | 600 | 17,000 | 20,400 | | |
| L | 7,000 | 1.0 | 0.5 | 5 | 300 | 8,300 | 22,200 | | | surfaces of the cement constituents, leaving the non-polar portions on the outside. In effect, the cement grains are thus rendered somewhat hydrophobic, thereby inhibiting premature hydration and maintaining the cement free-flowing in spite of its high fineness.

A list of grinding aids suitable for use in practicing the present invention would include diethyl carbonate, polyglycol derivatives and other non-ionic surfactants, sulfonates and other anionic surfactants, alkyl-ammonium salts and other cationic surfactants, and the like.

EXPERIMENTAL

The Type I and Type II clinker used in these experiments analyzed as follows:

| | Type I | Type II(1) | Type II(2) |
|---|---|---|---|
| $C_3S$ | 60.97 | 54.17 | 54.37 |
| $C_2S$ | 19.45 | 26.13 | 23.41 |
| $C_3A$ | 10.28 | 4.48 | 6.60 |
| $C_4AF$ | 7.30 | 13.28 | 8.49 |
| $Na_2O$ | 0.10 | 0.46 | 0.16 |
| $K_2O$ | 0.45 | 0.20 | 0.34 |
| Ignition loss | 0.11 | 0.10 | 1.68 |
| Free lime | 0.42 | 0.17 | 0.54 |
| Insoluble residue | 0.06 | Negligible | 0.70 |

In cement technology, "C" represents calcium oxide, "S" represents silica, "A" represents alumina, and "F" represents ferric oxide. The symbols "Na," "K" and "O" have their conventional chemical meanings. Type II(1) and Type II(2) clinker were obtained from different manufacturers.

In the general experimental procedure utilized, the clinkers and grinding aid when employed were ground in porcelain jars with hard ceramic pebbles. In the first two sets of experiments to be described, the quantity of grinding aid used was 0.005 part per part of clinker. The clinker was ground for about two days, during which a Blaine surface (ASTM Designation C204) of 7000 cm.²/g. or more was attained. The different grinding aids utilized had different effects on the workability, set retardation, compressive strength, and dimensional changes of the subsequent cement pastes as shown.

The ground clinker was dry mixed with the indicated quantity of calcium lignosulfonate; about one minute on a paint shaker was sufficient for good mixing. The ground clinker admixed with lignosulfonate was placed in a two-compartment mixer containing 0.20 part by weight of water having potassium carbonate dissolved therein in the other compartment. After the air was exhausted, the compartment separator was removed and the cement powder and solution mixed together for several minutes.

The resultant cement paste was compacted into cubic steel molds. After curing for one day under water, the one-inch concrete cubes were removed from the molds and stored in an atmosphere saturated with water for periodic compressive strength testing. The results obtained with Type I clinker are summarized below:

The essential ingredients of the grinding aids are as identified below:

A—Alkali lignin.
B—Polyglycol derivative in which the polyglycol chain contains 20 monomers and a molecule of nonylphenol.
C—Polyglycol derivative in which the polyglycol chain contains 13 monomers and a molecule of nonylphenol.
D—Polyglycol derivative in which the polyglycol chain contains 6 monomers and a molecule of trimethylnonylphenol.
E—Diethyl carbonate.
F—Polyglycol derivative in which the polyglycol chain contains 10 monomers and rosin.
G—Dodecylbenzene sodium sulfonate.
H—Polyethylene glycol monostearate with 65 monomers in the polyethylene chain.
I—Alkyl sulfonate and sulfocarboxylate.
J—Alkyl sulfosuccinate and alkyl sulfonate, amine salts, and isopropyl alcohol.
K—Alkyl sulfosuccinate and alkyl sulfonate, amine salts.
L—Alkyl sulfosuccinate and alkylphenolpolyglycol.

The consistencies of the cement pastes shown in the table are according to the following scale:

0—Sets in the mixing chamber.
1—Barely plastic and must be rammed into mold.
2—Moves with difficulty even when mold is vibrated.
3—Flows easily when mold is vibrated.
4—Flows freely when mixing chamber is tapped.
5—Flows freely.
6—Very watery.

It is apparent from the experiments summarized in the table that the choice of a particular grinding aid will affect the consistency of the subsequent paste made from the ground clinker. The grinding aid does not by itself control consistency but acts in conjunction with the calcium lignosulfonate and potassium carbonate present. For example, with grinding aid L further lowering the amount of lignosulfonate and potassium carbonate to 0.50% and 0.25%, respectively, yields a paste which sets in the mixing chamber. Increasing the calcium lignosulfonate and potassium carbonate over the preferred amounts generally does not improve the consistency of the paste obtained. As illustrated with grinding aid A, excess additive may impair ultimate concrete strength.

It should be noted that poor cement paste consistency does not necessarily lead to low concrete strength. Various pastes with consistency 1 have 28-day strengths only slightly below those of corresponding samples with consistency 5. However, the samples showing highest 28-day strengths had the optimum paste consistencies of 4 and 5.

The results obtained with Type II(1) clinker using 0.5% of the indicated grinding aid and 0.5% of potassium carbonate are summarized below:

The essential ingredients of the grinding aids are:

E—Diethyl carbonate
M—Triethanol amine
N—Alkylphenol sulfonate
O—Ethylene glycol.

TABLE II

| Grinding aid | Surface, cm.²/g. | Percent ligno-sulfonate | Consistency | Compressive strength, p.s.i.,— | | | | |
|---|---|---|---|---|---|---|---|---|
| | | | | 1 day | 7 days | 28 days | 90 days | 180 days |
| A | 6,400 | 0.5 | 4-5 | 12,500 | 20,500 | 25,200 | 28,400 | |
| D | 6,860 | 0.5 | 5 | 1,400 | 26,600 | 30,400 | | |
| E | 7,900 | 1.0 | 6 | 300 | 12,100 | 15,900 | 30,500 | |
| E | 7,900 | 0.5 | 5 | 7,000 | 30,100 | 33,800 | 35,200 | 35,800 |
| F | 6,630 | 1.0 | 6 | 150 | 150 | 26,800 | 34,700 | |
| F | 6,630 | 0.3 | 5 | 10,400 | 29,500 | 28,100 | 28,600 | 33,700 |

The amount of grinding aid employed was 0.5% by weight based on cement as before. Type II cements hydrate more slowly than Type I cement and less retarding is required. Thus, 1.0% calcium lignosulfonate and 0.5% potassium carbonate gave a watery paste and the compressive strength of the resultant concrete was significantly lower than normal. Adjusting the lignosulfonate content to 0.5% generally gave a paste with the ideal consistency 5. Even as little as 0.3% lignosulfonate with grinding aid D gave a paste having that consistency.

With respect to the hardened cement paste made from Type I and Type II(1) cement, the one-day values for compressive strengths showed wide variations ranging from 300 to 14,000 p.s.i. The variation in 7-day strengths was much less ranging from 11,000 to 18,600 p.s.i. The relative variation in 28-day strengths was still smaller ranging from 20,000 to 29,700 p.s.i. These variations continued to diminish and were not significant on testing at 90 days or at 180 days when essentially final strength was achieved.

The wide initial differences between grinding aid effects on rate of strength development also diminish with time and the ultimate strength differences become slight. It appears that the hydrophobic film formed by the grinding aid on the surfaces of cement grains makes initial access of water to the grain difficult, retarding hydration to a degree depending on the particular grinding aid utilized. The hydrated cement has a greater specific volume than the unhydrated powder, and expands disrupting the hydrophobic film, permitting more direct access of water and accelerating the hydration reaction; the reaction later decelerates as hydration approaches completion. For example, with grinding aid A, the retarding period is over in a few hours and relatively high paste strength is achieved within 24 hours. With grinding aid G, the retarding period is rather lengthy and paste strength remains very low for the first day but increases rapidly the next day.

In further experiments, the effect of diminishing the quantity of grinding aid was investigated using Type II(1) clinker. The potassium carbonate content was kept at 0.5 and the water-to-cement ratio was 0.20. The results are shown in Table III.

The results show that a Blaine surface of about 6000 cm.²/g. can be reached with as little as 0.05% of grinding aid M, but the consistency, setting time and 1-day compressive strength are unacceptable. On the other hand, 0.2% of grinding aid N gave excellent results.

In certain applications of concrete, a high 1-day strength is essential. For such uses of concrete, 0.2% of grinding aid N is suitable, but 0.1% of grinding aid E is not. With 1% lignosulfonate, a consistency of 4 is obtained, which is not ideal, but acceptable; however, the 1-day strength is very low. On the other hand, in many applications of concrete a very high 1-day strength is not essential, and for such applications 0.1% of grinding aid E is satisfactory. The compressive strength results for 0.1% of grinding aid E are 5,900 p.s.i. after 2 days, 13,800 p.s.i. after 3 days, and 23,600 p.s.i. after 7 days. The 7-day strength obtained with 0.1% of grinding aid E was equal to the 7-day strength obtained with 0.2% of grinding aid N. The 7-day strengths with 0.2% of grinding aid N were 23,900 p.s.i., when 0.6% lignosulfonate was used, and 22,600 p.s.i. when 0.8% lignosulfonate was used.

The actual retardant, of course, is the combination of grinding aid, lignosulfonate and carbonate. At least 0.25% by weight of lignosulfonate is required in any case to avoid premature setting of the cement paste. With most grinding aids in Type I cement, 1.0% by weight of lignosulfonate is required. With most grinding aids in slower hydrating Type II cement, 0.5% by weight of lignosulfonate is adequate, and even less may give superior results. For example, Type II(1) cement with grinding aid D and 0.3% lignosulfonate gave exactly the same early strength curve up to 24 hours as Type I cement with the same grinding aid and 1.0 percent lignosulfonate.

The joint action of calcium lignosulfonate and potassium carbonate is illustrated in Tables IV and V. In these experiments, Type II(2) clinker was ground to a Blaine surface of 6000 to 6200 cm.²/g. with 0.2% of grinding aid N. In Table IV, the results are given for a water-to-cement weight ratio of 0.20, and in Table V for a water-to-cement ratio of 0.25. In each square, the top row

TABLE III

| Grinding aid | Blaine surface (cm.²/g.) | Percent ligno-sulfonate | Consistency | Setting time (minutes) | 1-day compressive strength (p.s.i.) |
|---|---|---|---|---|---|
| E (0.1%) | 5,900 | 0.50 | 3 | 40 | 4,500 |
| | | 0.75 | 3 | 60 | 1,200 |
| | | 1.00 | 4 | 100 | 700 |
| M (0.05%) | 5,900 | 1.00 | 2 | 5 | 500 |
| | | 1.50 | 2 | 30 | 0 |
| M (0.1%) | 6,000 | 0.50 | 1 | 5 | 10,200 |
| | | 1.00 | 1 | 5 | 2,800 |
| N (0.2%) | 6,250 | 0.50 | 5 | 25 | |
| | | 0.60 | 5 | 35 | 14,700 |
| | | 0.80 | 5 | 50 | 9,000 |
| | | 1.00 | 5 | 80 | 5,000 |
| O (0.08%) | 6,500 | 0.50 | 2 | 5 | 15,100 |
| | | 0.75 | 2 | 10 | 5,600 |
| | | 1.00 | 2 | 15 | 400 | represents the consistency, the middle row the setting time in minutes, and the bottom row the 1-day compressive strength in p.s.i.

TABLE IV
[W./c.=0.20]

| Percent Ca-lignosulfonate: | | | | | |
|---|---|---|---|---|---|
| 1.00 | 1 | 4-5 | 5 | 4-5 | 4-5 |
|  |  | 45 | 60 | 155 | 190 |
|  | 0 | 0 | 200 | 5,825 | 8,000 |
| 0.75 |  | 4-5 | 5 | 5 | 3-4 |
|  |  | 20 | 37 | 90 | 80 |
|  |  | 0 | 200 | 14,100 | 13,100 |
| 0.50 |  |  | 5 | 5 | 3-4 |
|  |  | 12 | 15 | 17 | 50 |
|  |  | 0 | 12,100 | 14,100 | 15,200 |
| 0.25 |  | 2 | 2 | 1-2 | 2 |
|  |  | <5 | <5 | 6 | 8 |
|  |  |  |  | 12,700 | 14,100 |
| 0.00 | 0 |  |  |  |  |
|  | <5 |  |  |  | <5 |
| Percent K₂CO₃ | 0.00 | 0.25 | 0.50 | 0.75 | 1.00 |

TABLE V
[W./c.=0.25]

| Percent Ca-lignosulfonate: | | | | |
|---|---|---|---|---|
| 1.00 | 5 | 5 | 5 | 4-5 |
|  | 130 | 150 | 150 | 150 |
|  | 0 | 1,000 | 4,825 | 6,975 |
| 0.75 | 5 | 5 | 5 | 5 |
|  | 70 | 85 | 90 | 95 |
|  | 2,300 | 7,350 | 9,200 | 8,950 |
| 0.50 | 4-5 | 4-5 | 4 | 4 |
|  | 40 | 40 | 40 | 35 |
|  | 7,750 | 8,800 | 8,300 | 8,650 |
| Percent K₂CO₃ | 0.75 | 1.00 | 1.25 | 1.50 |

As shown in Table IV, calcium lignosulfonate alone or potassium carbonate alone is ineffective. The optimum condition is obtained with 0.75% calcium lignosulfonate and 0.75% potassium carbonate. The consistency of 5, setting time of 90 minutes, and 1-day strength of 14,100 p.s.i. observed are all highly satisfactory.

Mortars and concretes require a higher water-to-cement ratio and cement pastes with a water-to-cement ratio of 0.25 were made and evaluated. As shown in Table V, optimum lignosulfonate content is still 0.75%, but the optimum potassium carbonate content is 1.25%, higher than the corresponding value in Table IV. Apparently, not only the amount but also the concentration of carbonate is important, and the higher water content of the paste necessitates a larger amount of potassium carbonate. The 1-day compressive strength at the optimum, 9,200 p.s.i., is lower than in Table IV, because of the higher water-to-cement ratio, but it is still much higher than the strengths of pastes prepared with water-to-cement ratios of 0.4 and higher, now used in concreting practice.

The substitution of calcium lignosulfonate by other sulfonated lignin products was investigated in the experiments shown in Table VI. The essential constituents of the set retarders are as follows:

A—Lignin with one half mole of sulfonation per lignin unit of 840 grams.
B—Lignin with one mole of sulfonation per lignin unit of 840 grams.
C—Lignin with two moles of sulfonation per lignin unit of 840 grams.
D—Lignin with four moles of sulfonation per lignin unit of 840 grams.
E—A sulfonic acid derivative of Kraft lignin chemically modified to produce a large number of hydrophilic groups.
F—Highly sulfonated purified Kraft lignin.

The clinker used in these experiments was Type II(2) ground to a Blaine surface of 6000–6200 cm.²/g. with 0.2% of grinding aid N. The water-to-cement ratio was 0.20 and the amount of potassium carbonate was 0.75% of the weight of the clinker.

TABLE VI

| Set retarder | Percent | Consistency | Setting time, minutes | 1-day compressive strength, p.s.i. |
|---|---|---|---|---|
| A | 0.50 | 3-4 | 5 | 11,900 |
|  | 0.75 | 4-5 | 20 | 10,800 |
|  | 1.00 | 5 | 40 | 10,250 |
| B | 0.50 | 3-4 | 20 | 10,650 |
|  | 0.75 | 5 | 45 | 9,800 |
|  | 1.00 | 5 | 55 | 8,400 |
| C | 0.50 | 3-4 | 20 | 11,600 |
|  | 0.75 | 5 | 45 | 10,100 |
|  | 1.00 | 5 | 55 | 11,800 |
|  | 1.25 | 5 | 45 | 9,000 |
|  | 1.50 | 5 | 40 | 7,800 |
| D | 0.50 | 3 | 8 | 13,500 |
|  | 0.75 | 4 | 25 | 12,300 |
|  | 1.00 | 4-5 | 25 | 10,000 |
| E | 0.50 | 5 | 35 | 12,650 |
|  | 0.75 | 5 | 60 | 6,600 |
|  | 1.00 | 4 | 85 | 2,300 |
| F | 0.50 | 5 | 25 | 11,200 |
|  | 0.75 | 5 | 50 | 10,650 |
|  | 1.00 | 5 | 60 | 9,600 |

The results summarized in Table VI indicate that a satisfactory combination of consistency, setting time, and 1-day compressive strength can be attained with various sulfonated lignin products. The best overall results were obtained with 1.0% of set retarder C. Increasing the quantity of this set retarder to more than 1% led to less satisfactory results.

In experiments on mortar, Type II(2) clinker was ground to a Blaine surface of 6000 to 6200 cm.²/g., with 0.2% of grinding aid N. The water-to-cement ratio was 0.20 to 0.26, and the weight ratio of aggregate-to-cement was 2.5. The aggregate had the following grading:

| Sieve: | Percent |
|---|---|
| −4+8 | 34.0 |
| −8+16 | 24.8 |
| −16+30 | 18.0 |
| −30+50 | 13.4 |
| −50+100 | 9.8 |

Immediately after mixing, the fresh mortar was tested for consistency and setting time. For the strength tests, the fresh mortar was placed into 2-inch cube molds and was compacted by vibration. The samples were then exposed to 100% humidity at 25° C. for 24 hours. After that, those samples which were not tested for 1-day strength were further cured under water.

The consistency of the mortar was determined by using a flow table according to ASTM Standard C103. The determination was made as described in ASTM Standard C109, Section 9, except that the table was dropped 15 times instead of 25 times.

TABLE VII

| Mortar No. | Percent K₂CO₃ | Percent Ca-lignosulfonate | W./c. | Consistency Min. | Consistency Percent | Setting time (min.) | Compressive strength Days | Compressive strength P.s.i. |
|---|---|---|---|---|---|---|---|---|
| 1 | 0.75 | 0.75 | 0.20 | 5 | 4 | 15 | 1 | 8,800 |
|  |  |  |  |  |  |  | 3 | 12,600 |
|  |  |  |  |  |  |  | 32 | 15,500 |
| 2 | 0.50 | 0.50 | 0.25 | 5 | 50 | 8 | 1 | 5,360 |
|  |  |  |  |  |  |  | 4 | 13,000 |
| 3 | 1.00 | 0.70 | 0.25 | 8 | 40 | 20 | 1 | 8,200 |
|  |  |  |  |  |  |  | 4 | 12,500 |
| 4 | 1.00 | 0.85 | 0.25 | 5 | 45 | 50 | 1 | 3,500 |
|  |  |  |  | 15 | 37 |  | 7 | 15,250 |
|  |  |  |  | 25 | 33 |  |  |  |
|  |  |  |  | 35 | 30 |  |  |  |
| 5 | 1.25 | 0.60 | 0.25 | 5 | 39 | 25 | 1 | 10,925 |
|  |  |  |  | 15 | 20 |  | 4 | 13,500 |
|  |  |  |  | 20 | 5 |  |  |  |
| 6 | 1.25 | 0.75 | 0.25 | 6 | 30 | 25 | 1 | 9,850 |
|  |  |  |  | 15 | 25 |  | 4 | 12,700 |
|  |  |  |  | 20 | 6 |  |  |  |
| 7 | 1.25 | 0.75 | 0.25 | 5 | 50 | 40 | 1 | 6,500 |
|  |  |  |  | 15 | 44 |  | 4 | 13,000 |
|  |  |  |  | 25 | 31 |  |  |  |
|  |  |  |  | 30 | 19 |  |  |  |
|  |  |  |  | 35 | 12 |  |  |  |
| 8 | 1.25 | 0.75 | 0.26 | 5 | 95 | 50 | 1 | 5,350 |
|  |  |  |  | 30 | 57 |  |  |  |
|  |  |  |  | 40 | 19 |  |  |  |
|  |  |  |  | 45 | 10 |  |  |  |

The results on the mortars are shown in Table VII. Under "consistency" there are two columns. The left hand column shows the time elapsed between the start of the mixing and the start of the test, in minutes; the right hand column shows the increase in the diameter of the sample at the end of the test, in percent. The percentage increase becomes smaller as the time preceding the test becomes longer. The setting time is the time elapsed between the start of the mixing and the time when the mortar exhibited zero flow. The time of the mixing was 3 minutes, but because it is difficult to establish the time of zero flow, the setting time cannot be determined exactly.

Sample 1 was prepared with a water-to-cement ratio of 0.20. Very high 1-day and later strengths were obtained, but the mortar was very stiff, and the setting time was short. On the other hand, very good results could be obtained with a water-to-cement ratio of 0.25. Sample 7, with 0.75% calcium lignosulfonate and 1.25% potassium carbonate, gave good consistency, a setting time of about 40 minutes, and compressive strengths of 6500 p.s.i. for 1 day and 13,000 p.s.i. for 4 days Those strengths results can be compared with results required for mortars by the standard specifications for portland cement, ASTM Designation C150–50. A 1-day compressive strength requirement is prescribed only for the Type III cements; these are called high early strength cements. The test is on 2-inch mortar cubes by ASTM Standard C109, and the aggregate to cement ratio is 2.75. The water-to-cement ratio is approximately 0.5. The 1-day compressive strength requirement is 1700 p.s.i. The 1-day strength for Sample 7 in Table VII is almost four times as high as this value.

For Type II cements, the ASTM specifications are 1000 p.s.i. after 3 days, 1800 p.s.i. after 7 days, and 3500 p.s.i. after 28 days. Sample 7 in Table VII gave a strength of 6500 p.s.i. after 1 day, and 13,000 p.s.i. after 4 days.

Mortar, of course, is cement paste plus fine aggregate such as sand, and concrete is cement paste plus fine aggregate plus coarse aggregate such as crushed stone, gravel, etc. The same Type II clinker used in the previously described experiments on mortar was used to prepare concrete. The clinker was ground to a Blaine surface of 6000 to 6200 cm.²/g. with 0.2% of grinding air N. The amount of calcium lignosulfonate in the cement was 0.6%, the amount of potassium carbonate was 1.25%, and the water-to-cement ratio was 0.25. The aggregate to cement ratio was 4.0; 40% of the aggregate was the same as used in the mortar tests discussed earlier; 60% of the aggregate was coarse aggregate, ranging up to ¾ in. The concrete had good workability and acceptable setting time; the consistency and setting time were the same as those of Sample 5 in Table VII, which was the mortar prepared with the same amounts of calcium lignosulfonate, potassium carbonate, and water-cement ratio. The samples were placed in cylinders of 4 in. diameter and 8 in. length, and they were compacted by vibration. The compressive strength results for 1, 3 and 7 days are shown in Table VII, together with the results obtained for the controls.

TABLE VIII

| | Compressive strength, p.s.i. | |
|---|---|---|
| | Low-porosity concrete | Control |
| 1 day | 6,600 | 1,500 |
| 3 days | 8,400 | 2,800 |
| 7 days | 8,500 | 3,900 |

The controls were prepared from an excellent Type I cement of normal fineness, Blaine surface of 4000 cm.²/g. with a water-cement ratio of 0.5. (In normal concreting practice, the water-cement ratio used is between 0.4 and 0.6.) The same aggregates, and the same aggregate to cement ratio were used as for the concrete samples prepared with low-porosity paste, and in every respect the controls were treated in an identical manner with the low-porosity concrete samples.

Table VIII shows the great superiority of low-porosity concrete over conventional concrete. While a water-cement ratio of 0.5 was used for comparison with an average concrete, the strongest conventional concretes are presently made with a water-cement ratio of 0.4. On the basis of wide experience in concrete technology, one can calculate the compressive strength for concretes made with a water-cement ratio of 0.4, by multiplying the strengths obtained for the controls by 1.33. Thus, after 1 day, one would obtain a strength of 2000 p.s.i., and after 3 days 3700 p.s.i. The strength obtained for the low-porosity concrete after 1 day is 3.3 times that obtained for the best presently used concrete, and the factor is 2.3 after 3 days.

It was noted after the strength tests of the low-porosity 3-day and 7-day concrete samples that the coarse aggregate, especially the largest ones, split under the load. Thus, even though the strength of the paste doubtless increased, the determining factor was the strength of the coarse aggregate utilized. The strength of such concrete products can be increased by utilizing a finer or a stronger aggregate. For example, referring back to the tests on mortar, Sample 4 in Table VII gave a compressive strength of 15,250 p.s.i. after 7 days.

Cement pastes prepared with the now possible water-to-cement ratio of 0.20 exhibit not only very much greater strength but also much smaller shrinkage than conventional cement pastes. The pastes prepared according to the present invention expand during the first day of hydration much more than ordinary cement pastes; the initial volume expansion is 3–4%, as compared to about 1% volume expansion of conventional cement pastes. The result is that a shrinkage compensating expanding cement paste is obtained.

The cement pastes prepared with a water-to-cement ratio of 0.20 exhibit one-third to one-half the shrinkage of conventional pastes prepared with a water-to-cement ratio of 0.4, and with some compositions the shrinkage is less than one-third. Compared with conventional pastes prepared with a water-to-cement ratio of 0.6, the shrinkage is between one-third and one-fourth, and with some compositions the shrinkage is less than one-fourth. Since the shrinkage of concrete is directly proportional to the shrinkage of the cement paste in the concrete, it is apparent that concrete prepared with low-porosity cement paste would exhibit less shrinkage than present conventional concretes.

The initial larger than normal expansion exhibited by the compositions of the present invention is responsible in part for the very high compressive strengths obtained. Low-porosity cement pastes achieve a lower ultimate degree of hydration without extra expansion; the extra expansion allows room for additional hydration. The increased quantity of the hydrated cementing material in the paste increases the strength both of the paste and the concrete made with it. Increased strength is also attributed to the absence of gypsum. The strength of low-porosity paste, and that of its cement paste-aggregate systems, is about three times as high as that of conventional higher-water, gypsum-containing systems.

Other variations utilizing the principles described herein will suggest themselves to those skilled in the art and my invention is as claimed.

I claim:

1. A method for making a free-flowing expanding portland cement paste which comprises grinding portland cement clinker with at least 0.002 part by weight of grinding aid to a specific surface area between 6000–9000 cm.$^2$/g., and mixing the ground cement with at least 0.0025 part by weight of alkali or alkaline earth lignosulfonate or sulfonated lignin and then with about 0.20–0.28 part by weight of water containing at least 0.0025 part by weight of alkali carbonate, all per part of ground cement.

2. A method according to claim 1 wherein alkaline earth lignosulfonate is mixed with the cement clinker prior to or during grinding.

3. A method according to claim 1 wherein alkali lignosulfonate or sulfonated lignin is added together with and dissolved in the water.

4. A free-flowing expanding cement paste consisting of finely ground portland cement having a specific surface between 6000–9000 cm.$^2$/g., about 0.20–0.28 part by weight of water, at least 0.005 part by weight of a grinding aid, at least 0.25 part by weight each of an alkali or alkaline earth lignosulfonate or sulfonated lignin and alkali carbonate per part of cement.

5. A cement paste according to claim 4 consisting of finely ground portland cement having a specific surface area between 6000–9000 cm.$^2$/g., about 0.20–0.28 part by weight of water, about 0.002–0.005 part by weight of a grinding aid, 0.005–0.010 part by weight of calcium lignosulfonate and 0.005–0.015 part by weight of potassium carbonate per part of cement.

6. A free-flowing mortar composition consisting essentially of finely ground portland cement having a specific surface area between 6000–9000 cm.$^2$/g., at least 0.0005 part by weight of a grinding aid, at least 0.0025 part by weight each of an alkali or alkaline earth lignosulfonate or sulfonated lignin, at least 0.0025 part by weight of alkali carbonate, and about 0.25 part by weight of water, all per part of cement, in admixture with sand.

7. A free-flowing concrete composition consisting essentially of finely ground portland cement having a specific surface area between 6000–9000 cm.$^2$/g., at least 0.0005 part by weight of a grinding aid, at least 0.0025 part by weight each of an alkali or alkaline earth lignosulfonate or sulfonated lignin, at least 0.0025 part by weight of alkali carbonate, and 0.22–0.28 part by weight water, all per part of cement, in admixture with sand and crushed stone or gravel.

References Cited
UNITED STATES PATENTS

| | | | |
|---|---|---|---|
| 3,053,673 | 9/1962 | Walker | 106—90 |
| 2,889,228 | 6/1959 | Beach | 106—90 |
| 2,684,720 | 7/1954 | Lea | 106—90 |
| 2,646,360 | 7/1953 | Lea | 106—90 |
| 2,582,459 | 1/1952 | Salathiel | 106—90 |
| 2,360,519 | 10/1944 | Scripture | 106—314 |
| 2,307,485 | 1/1943 | Booth | 106—90 |
| 2,225,146 | 12/1940 | Bechtold | 106—90 |

JAMES E. POER, Primary Examiner

W. T. SCOTT, Assistant Examiner

U.S. Cl. X.R.

106—102, 315

UNITED STATES PATENT OFFICE
CERTIFICATE OF CORRECTION

Patent No. 3,689,294          Dated September 5, 1972

Inventor(s) STEPHEN BRUNAUER

It is certified that error appears in the above-identified patent and that said Letters Patent are hereby corrected as shown below:

In column 1, line 4, "Braunauer" should read --Brunauer--.

In column 9, line 16 (Mortar No. 6 in Table VII), "0.25" should read --0.24--.

In column 9, line 45, a period should follow "4 days".

In column 9, line 46, "Those" should read --These--.

In column 9, line 48, "C150-50" should read --C150-60--.

In column 12, line 7, "0.005" should read --0.0005--.

In column 12, line 8, "0-25" should read --0.0025--.

In column 2, line 61, "placticing" should read --practicing--.

Signed and sealed this 23rd day of October 1973.

(SEAL)
Attest:

EDWARD M. FLETCHER, JR.          RENE D. TEGTMEYER
Attesting Officer                Acting Commissioner of Patents